United States Patent
Mehlman et al.

(10) Patent No.: US 11,561,995 B2
(45) Date of Patent: Jan. 24, 2023

(54) MULTITENANT DATABASE INSTANCE VIEW AGGREGATION

(71) Applicant: salesforce.com, inc., San Francisco, CA (US)

(72) Inventors: Dan Mehlman, Bethesda, MD (US); Andrew Fawcett, Montara, CA (US)

(73) Assignee: Salesforce, Inc., San Francisco, CA (US)

( * ) Notice: Subject to any disclaimer, the term of this patent is extended or adjusted under 35 U.S.C. 154(b) by 79 days.

(21) Appl. No.: 17/316,894

(22) Filed: May 11, 2021

(65) Prior Publication Data
US 2022/0365944 A1 Nov. 17, 2022

(51) Int. Cl.
*G06F 16/25* (2019.01)
*G06F 16/27* (2019.01)
*G06F 16/28* (2019.01)

(52) U.S. Cl.
CPC ......... *G06F 16/252* (2019.01); *G06F 16/273* (2019.01); *G06F 16/283* (2019.01)

(58) Field of Classification Search
CPC ..... G06F 16/252; G06F 16/273; G06F 16/283
See application file for complete search history.

(56) References Cited

U.S. PATENT DOCUMENTS

| | | | | |
|---|---|---|---|---|
| 10,225,164 | B2* | 3/2019 | Revanuru | H04L 43/04 |
| 2014/0075565 | A1* | 3/2014 | Srinivasan | H04L 63/101 |
| | | | | 726/26 |
| 2017/0366605 | A1* | 12/2017 | Chang | H04L 49/70 |
| 2018/0316552 | A1* | 11/2018 | Subramani Nadar | |
| | | | | H04L 41/5045 |
| 2020/0322453 | A1* | 10/2020 | Said | H04L 67/1097 |
| 2021/0160192 | A1* | 5/2021 | Jain | H04L 47/80 |

* cited by examiner

*Primary Examiner* — Hares Jami
(74) *Attorney, Agent, or Firm* — Holland & Hart LLP

(57) ABSTRACT

A server may support an aggregation service for a multitenant system. The service may support a method for data processing that includes determining that a plurality of tenants of a multitenant database system correspond to a common entity, where each tenant is associated with a respective instance of a cloud platform that services data from a corresponding database instance. The method may further include provisioning a new database instance for the common entity, generating a connector that is configured to access data of the corresponding database instance, generating a schema for the new database instance that aggregates the data of each database instance accessed by the connector, and instantiating a new cloud platform instance that is configured to access the schema of the new database instance, where the new cloud platform instance is configured to serve data queried from the schema of the new database instance via a client application.

20 Claims, 10 Drawing Sheets

MULTITENANT DATABASE INSTANCE VIEW AGGREGATION

FIELD OF TECHNOLOGY

The present disclosure relates generally to database systems and data processing, and more specifically to multitenant database instance view aggregation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may be implemented on a multitenant system, such that each tenant may correspond to an instance of the cloud platform on the multitenant system. The multitenant system may maintain a separate database for each tenant and support various services for each tenant via the respective cloud platform. In some cases, multiple tenants of a multitenant system may correspond do the same entity, such as an organization.

DETAILED DESCRIPTION

Figure 1:
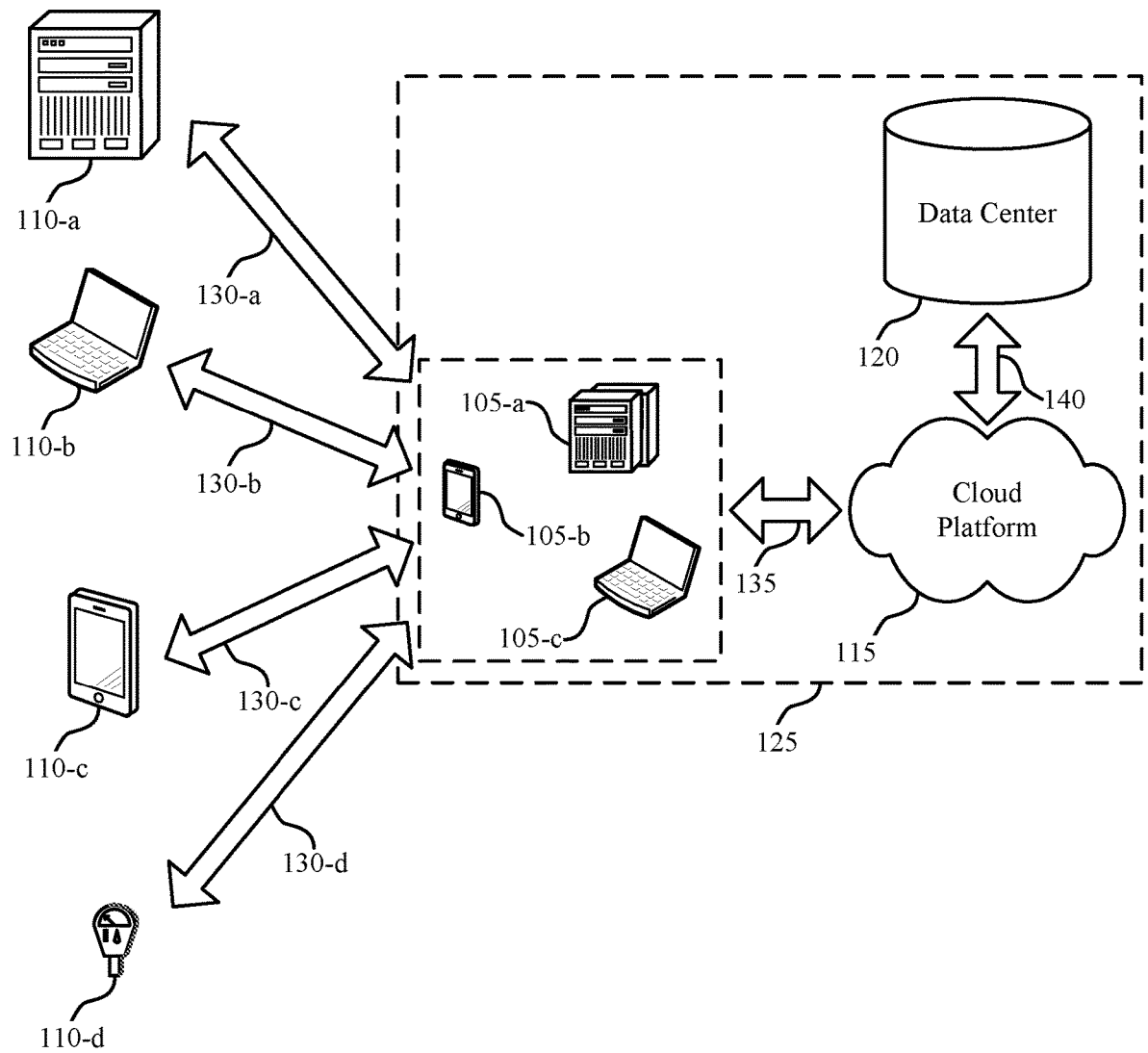
FIG. 1 illustrates an example of a data processing system that supports multitenant database instance view aggregation in accordance with aspects of the present disclosure.

In some examples, a cloud platform may support various services for an organization. These services may include customer relationship management (CRM) solutions, such as content and email distribution, contact management, customer management, and customer service solutions. Further, a cloud platform may support custom application development, such as user interface and dashboard development for sales teams. These custom applications as well as other CRM solutions may interact with a database instance corresponding to the cloud platform. A manager or higher level employee at the organization may use the cloud platform to ascertain an overall view of various aspects of the organization, such as CRM metrics. In some cases, an application supported by the cloud platform may support a user interface to provide the view of such metrics. The cloud platform may be supported by a multitenant system, such that the organization corresponds to one particular tenant of the multitenant system, but another organization may correspond to a separate tenant of the multitenant system. Each tenant may be associated with a different instance of the cloud platform and a corresponding database instance. As such, each cloud platform instance may be configured according to the particular tenant and the data (of the respective database instance) corresponding to the tenant may be serviced by the cloud platform instance.

In some examples, multiple tenants may correspond to the same organization. For example, an organization may have offices in different geographical locations, and each office location may be associated with a separate cloud platform instance (e.g., tenant) of a multitenant system. As another example, different departments at a university may be associated with different cloud platform instances. In such cases, it may be desirable for upper management to access a unified view of each tenant corresponding to the organization. However, to view such data, the manager may need to separately access each cloud platform instance. In other cases, the data may need to be replicated to another data management system and accessed by a cloud platform instance.

Techniques described herein support a unified view (e.g., an enterprise level view) of multiple tenants corresponding to the same common entity (e.g., the same organization). A new database instance may be provisioned within a multi-tenant system. A connector may be generated for each tenant of a set of tenants that correspond to the same common entity. Each connector may be configured to communicate data from the separate database instances corresponding to set of tenants to the newly provisioned database instance corresponding to the common entity. The connectors may be configured to access at least a portion of the data of the separate instances. In some cases, a connector may be configured to replicate data from the separate instances into the new instance. In other cases, the connectors may use a foreign data wrapper that access the data of the separate instances without replication. In the new database instance, a view or a schema corresponding to the data may be generated. A new cloud platform instance may be generated to access the data of the view or schema, which may provide a unified view of the data corresponding to the set of tenants of the common entity. This technique may support the unified view without replicating data to an external system, which may be costly and result in significant resource overhead. These and other techniques are further described with respect to the figures.

Aspects of the disclosure are initially described in the context of an environment supporting an on-demand database service. Aspects of the disclosure are further described with respect to a computing architecture illustrating view aggregation, a system diagram illustrating various communications to support view aggregation, and a process flow diagram. Aspects of the disclosure are further illustrated by and described with reference to apparatus diagrams, system diagrams, and flowcharts that relate to multitenant database instance view aggregation.

FIG. 1 illustrates an example of a system 100 for cloud computing that supports multitenant database instance view aggregation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to various applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, each of the cloud clients 105 may be associated with a different instance of the cloud platform 115. More particularly, each tenant may be provisioned with a separate instance of the cloud platform 115 and corresponding database instance. As such, aspects of the subsystem 125 may be a multitenant system. In such cases, each instance of the cloud platform 115 may be separately configured for each tenant in order to provide custom services for the tenant. Additionally, the corresponding database instance may be implemented for the tenant. Using this multitenant architecture, various resources may be scaled in order to support various services provided by the cloud platform for the tenant.

As each instance of the cloud platform 115 may support various services, such as CRM services, the cloud platform 115 may provide various different views of the data. For example, a manager of an entity corresponding to an instance of the cloud platform 115 may access the cloud platform 115 to view sales data, content engagement data, customer data, and the like. In some examples, the cloud platform 115 supports application development to create applications that are able to provide the views as well as other interactions with the data. The cloud platform 115 may be an example of a platform as a services (PaaS).

In some cases, a single entity (e.g., cloud client 105) may be associated with multiple instances of the cloud platform 115. For example, a company may have separate cloud platform instances 115 and corresponding database instances for various different office locations, divisions, etc. In some cases, a manager may want to view data across the various instances of the cloud platform 115. Aspects of the present disclosure support a unified view of data for multiple tenants (e.g., cloud client 105) that correspond to the same common entity.

To support the aggregated view, a new database instance may be provisioned for the common entity and within the subsystem 125, which may be an example of a multitenant system. A set of connectors may be generated, and each connector may correspond to one of the tenants associated with the same entity. Each connector may be configured to access data the respective database instances for the tenants to support an aggregated view of the data. In some cases, a connector may replicate the data from the database instance. Additionally or alternatively, a connector may use a foreign data wrapper to access the data of the separate data instance, such that the data is not replicated to the new database instance. A view of the data of the new database instance may be generated, and a new cloud platform may be instantiated and configured to access the data of the view. Thus, a manager may access the data of multiple tenants using a new cloud platform instance. This techniques may support this aggregated view without replication of the data to an external system, which may be costly and resource intensive. Further, as the view functions as a database object, the new cloud platform instance 115 may be able to access the data without significant reconfiguration.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
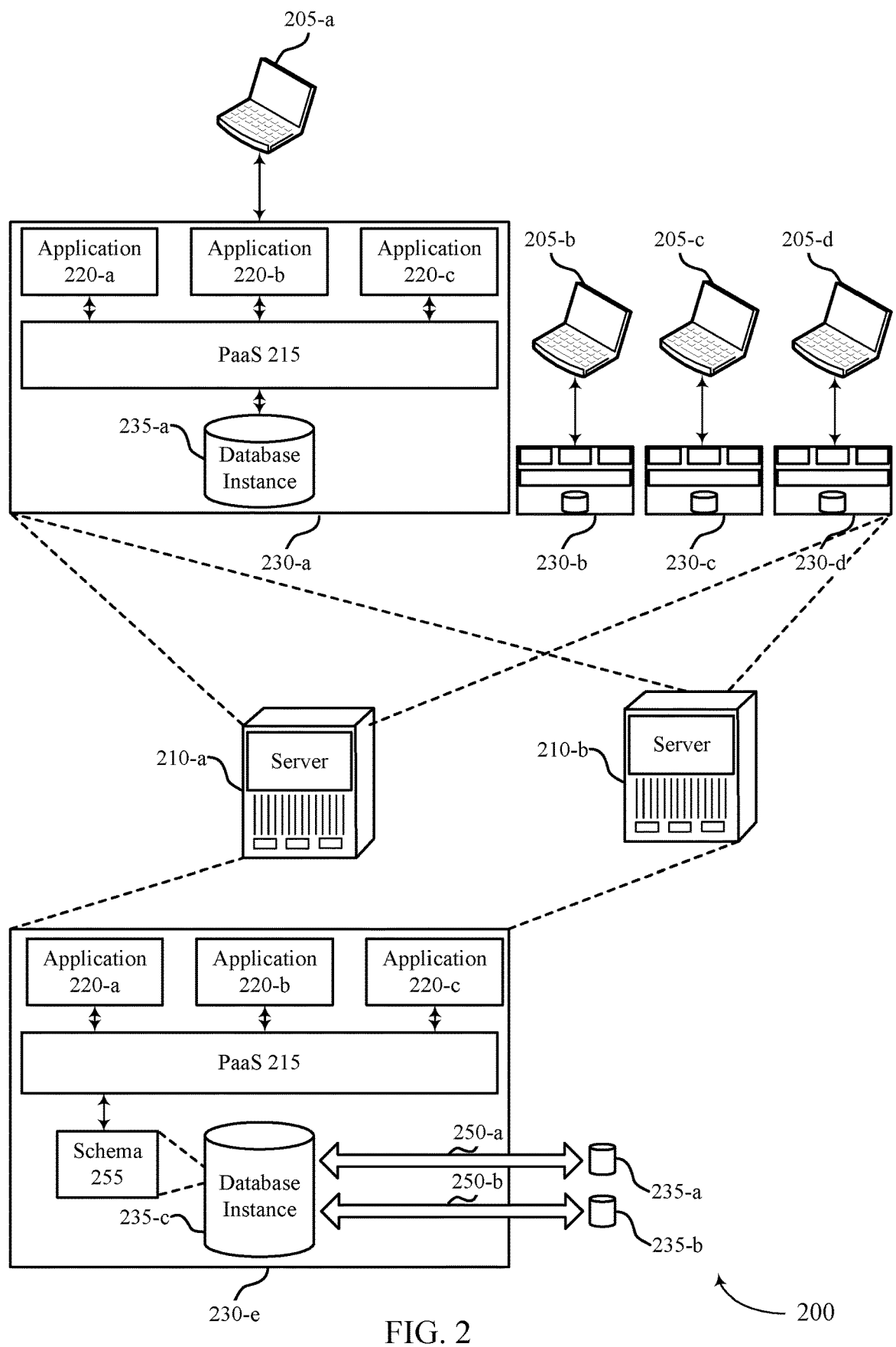
FIG. 2 illustrates an example of a computing architecture that supports multitenant database instance view aggregation in accordance with aspects of the present disclosure.

FIG. 2 illustrates an example of a computing architecture 200 that supports multitenant database instance view aggregation in accordance with aspects of the present disclosure. The computing architecture 200 includes servers 210 and user devices 205. The servers 210 may represent physical and logical systems that support various services, applications, data management, etc., and the servers 210 may be implemented in the same physical locations or may be physically separated. The servers 210 may represent aspects of the subsystem 125, cloud platform 115, and data center 120 of FIG. 1. User devices 205 may be examples of devices associated with cloud clients 105 or contacts 110 of FIG. 1.

The servers 210 may support a multitenant system. For example, the servers 210 may support a set of cloud platform instances 230, where each cloud platform instance 230 corresponds to a different tenant of the multitenant system. Each cloud platform instance 230 may include systems and logic for supporting various applications 220 that are accessible via user devices 205. A cloud platform instance 230 may correspond to various default, configurable, and developed applications 220, compute clusters and operating systems that support the applications 220 and associated services and systems. Each tenant may be associated with a database instance 235-a that is used to store and manage data associated with a tenant. A database instance 250-a may be an example of a relational database, a data lake, and the like, or any combination thereof. A database instance 235 for each tenant may be provisioned from a set of physical servers 210, and the databases may be scaled as needed for a tenant. Applications 220 may serve data from the respective database instances 230 to users via user devices.

In some cases, applications 220 and associated systems may be developed and provisioned using a platform as a services (PaaS) 215. PaaS 215 may be an example of an object oriented development platform for creating applications 220. The PaaS 215 may reduce complexity related to application development (e.g., solution development) and may support various extensions related to the cloud platform instances 230. In some cases, the PaaS 215 may be referred to as a cloud based development platform. The PaaS 215 may be used to create connectors that connect a cloud platform instance 230 to the corresponding database instance 235 (e.g., a postgres database instance).

As described herein, each cloud platform instance 230 may correspond to a particular tenant of the multitenant system. In some examples, set of tenants may correspond to the same entity, which may be an example of a company, organization, team, etc. For example, a first tenant and the corresponding cloud platform instance 230 may correspond to a European office, and a second tenant and the corresponding cloud platform instance 230 may correspond to a North American Office. These tenants and associated cloud platform instances 230 and data (e.g., database instance 235) may be separated in order to provide better service to the localities in which the offices are positioned, to satisfy data locality constraints, or the like. For example, a company policy or various regulations may set forth constrains on where data corresponding to customers may be located and how and where such data may be transmitted and stored. As such, the databases and cloud platforms may be provisioned in certain physical locations. As another example, an organization may have multiple cloud platform instances 230 (e.g., tenants), where each cloud platform instance 230 corresponds to a different team or department within the organization.

Techniques described herein support aggregation of cloud platform instances 230 and corresponding database instances 235. For example, an upper layer manager or another employee or officer of the organization that is associated with multiple tenants of the multitenant system may want to view data, metrics, etc. for the multiple offices and tenants, and the techniques described herein support such views without having to move the data to external systems and without requiring the user to access each separate instance. Further, the techniques herein support a near real-time view of the data, as the data changes within each separate cloud platform instance 230 and corresponding database instances 235.

The system (e.g., servers 210) may determine that multiple tenants correspond to the same entity. The identification may be based on an indication by the user, based on the tenants being associated with a same common entity identifier, or via some other indication. The system may also determine that a common view and/or a new cloud platform instance 230 is to be instantiated. This determination may be based on a user activating the process or service (e.g., aggregation services) described herein (e.g., executing or opening an application, menu, etc.). For example, a user interface may be provided to activate the common view/instance. In order to provide the new cloud platform instance 230-e, the system may provision a new database instance 235-c for the common entity. The new database instance 235-c may be provisioned according to various configurations selected by the user, various default configurations (e.g., provided by the PaaS 215), or a combination thereof. In some cases, the user may select a geographic location for the database instance 235-c.

Additionally, the system may generate a connector 250 for each database instance corresponding to one of the tenants that is associated with the common entity. In some cases, a user may use a user interface supported by the system to generate the connector 250. In some examples, the user may configure the connector to link the new database instance 235-b and the database instances that correspond to the cloud platform instances 230 that are associated with the tenants of the common entity. Each connector 250 may be configured to access the data of the corresponding database instance 235. For example, the cloud platform instances 230-a and 230-b may correspond to the same tenant. As such, the connectors may be generated to link the database instance 235-a and the database instance 235-b to the new database instance 235-c. In some cases, the connectors 250 may replicate the data from the respective database instance to the new database instance 235-c. The connector may be configured to periodically synchronize the data between the database instances 235. As such, each database instance may reflect the near real-time state of the data. The data in the new database instance 235-c may be configured as a mapping between objects of the new database instance 235-c and one or more objects of the database instances 235-a and 235-b. In some cases, a new object may be defined in the new database instance 235-c, and the data may be mapped from the database instances 235-a and 235-b to the new object of the new database instance 235-c A connector 230 may be an example of service that exposes data for consumption by other services. A connector 230 may be configured to synchronize data between cloud platform instances 230 and a database instance. In some examples, as a user is configuring the connectors 250, the user may select the objects and the fields of the objects that are to be mapped to the new database instance 235-c. In some cases, this mapping creates a copy of the selected objects to the new database instance 235. The user selection may be supported by a user interface that allows the user to select data that is to be sect.

To support the new cloud platform instance 230-e a view or schema 255 of the data of the new database instance may be generated. A schema may be correspond to one or more new database tables that are generated as a result of a query for the data accessed by the connectors 250-b. For example, the data accessible by the connectors 250 (and replicated to the new database instance 235-c) may be queried to define the view. The view may configured as public for consumption by the applications 220 of the new cloud platform instance 230-e. As the view is generated based on a query, it may not be physically generated or allocated in the database instance 235-c. Rather, each time the view is reference by a query from one or more of the applications 220, the view may be generated (e.g., the query associated with the view is executed). As such, the view may reflect the latest or near real-time data of the query.

Further, the new cloud platform instance 230-e may be instantiated (e.g., processing resources allocated, operating system configured), and the new cloud platform instance 230-e may be configured to access the view for serving the data via the applications 220. Thus, a user may access the cloud platform instance 230-e to access the data of each of the cloud platform instances 230-a and 230-b that are associated with the tenant or same common entity. Further, this technique may support the access without replication of the data of the database instances 230 to external systems, which may be costly and utilize significant processing resources.

In some cases, the PaaS 215 may provide various services, such as database provisioning and connector 250 generation. These services may be accessible via a user interface supported by the PaaS 215. Further, the PaaS 215 may support application programming interfaces (APIs) that may be used to access these services. The aggregation service described herein may support a user interface that is configured to call the APIs in order to facilitate the aggregated view. That is, the service may be built on the cloud platform instance 230 using a programming language supported by the cloud platform instance 230. The service wraps the API calls of the PaaS 215 in the supported programming language in order to facilitate a streamlined view aggregation experience.

Figure 3:
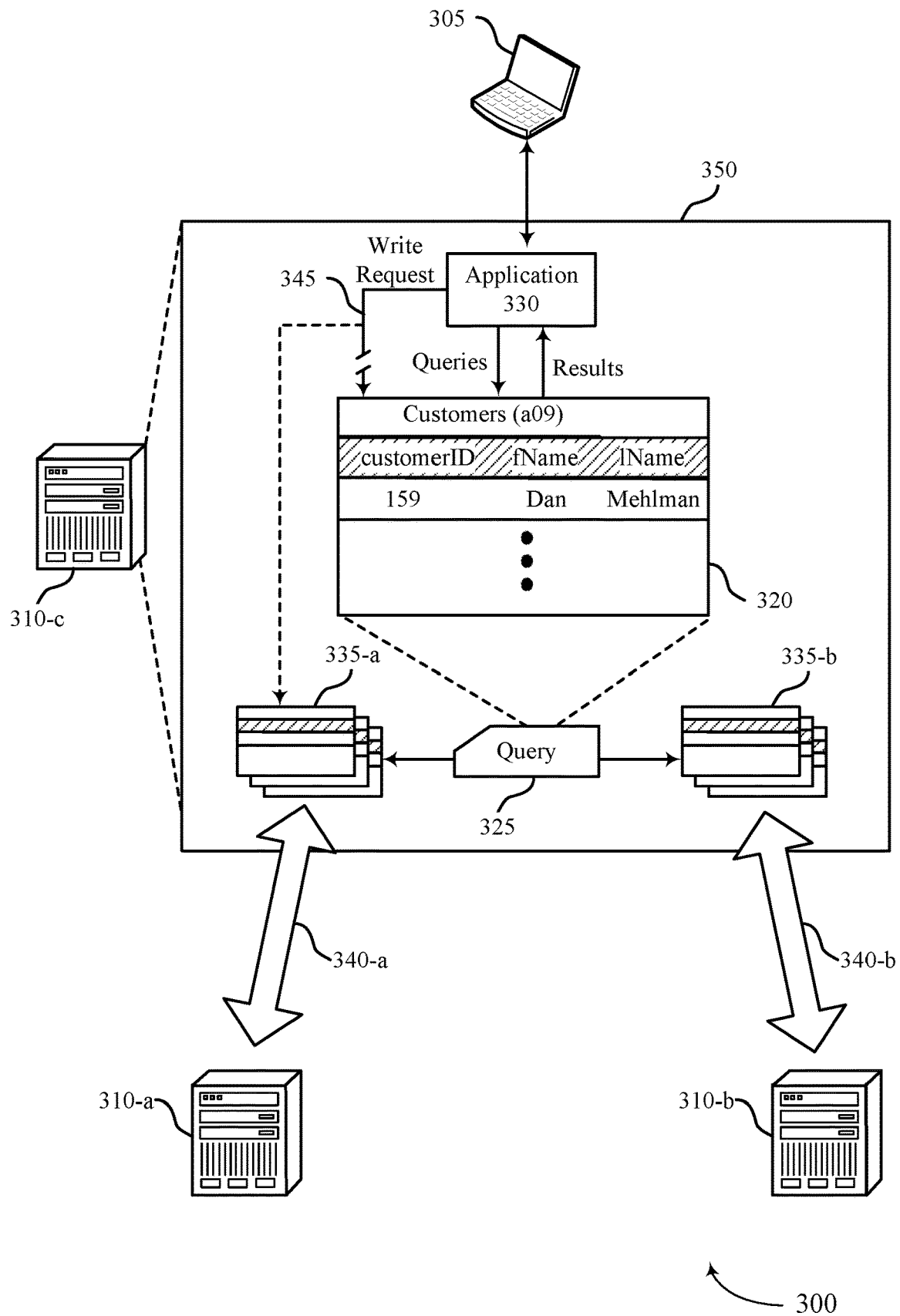
FIG. 3 illustrates an example of a system that supports multitenant database instance view aggregation in accordance with aspects of the present disclosure.

FIG. 3 illustrates an example of a system 300 that supports multitenant database instance view aggregation in accordance with aspects of the present disclosure. The system 300 includes servers 310 and a user device 305, which may be examples of the corresponding devices as described with respect to FIGS. 1 and 2. For example, the servers 310 may be configured to support a multitenant system include various cloud platform instances and corresponding database instances as described with respect to FIG. 2. The database instances may support various data tables (e.g., data tables 335) that correspond to data objects for tenants of the multitenant system. In some cases, the data tables and database instances are supported by one or more servers 310 in the same geographic location. In some cases, the data tables are in multiple geographic locations, and data updates are replicated across the corresponding database instances.

As illustrated in FIG. 3, data tables 335-a (e.g., corresponding to a first database instance for a first tenant) are supported by server 310-a and data tables 335-b (e.g., corresponding to a second database instance for a second tenant) are supported by server 310-b. It should be understood that the servers 310-a and 310-b may represent the same servers or server systems or may represent separate servers and server systems. The data of data tables 335-a may be accessed and modified using a cloud platform instance corresponding to the first tenant, and the data of data tables 335-b may be access and modified using a cloud platform instance corresponding to the second tenant. As described herein, in some examples, the first and second tenant may correspond to the same common entity. As such, techniques described herein support an aggregated view and access to the data using a new cloud platform instance 350.

For example, to support the aggregated view, a new database instance may be provisioned according to default configurations or configurations selected by a user. The database instance may be provisioned in a geographic location (e.g., selected by the user) or locations, and the corresponding systems and database components may be activated at the servers corresponding the geographic location(s). Further, a set of connectors 340 may be generated for each of the database instances corresponding to the tenants that are associated with the common entity. Thus, the connector 340-a is generated for the database instance corresponding to the first tenant, and the connector 340-b is generated for the database instance corresponding to the second tenant. Each connector 340 may be configured to access the data of the corresponding database instance. In some cases, the connector 340 may replicate data from the database instance to the new database instance. As illustrated in FIG. 3, the data tables 335-a are replicated into a new database instance of the server 310-c by the connector 340-a, and the data tables 335-b are replicated to the new database instance of the server 310-c by the connector 340-b.

In some examples, the data is not replicated by the connectors 340-b, but rather, the connectors 340-b are configured to access the data using a foreign data wrapper. For example, a foreign data wrapper may be used to access the data of the data tables 335-b. A foreign data wrapper may be supported by a library that is configured to communicate with an external data source, such as another database instance. A foreign data wrapper may be an example of a foreign data table object. The foreign data table object may define the structure of the remote data, but no data may be stored at the local database instance. When a foreign data wrapper is used, the foreign data wrapper may fetch the data from the external source or transmit the data to the external source. Thus, in cases where the external data source is associated with data locality constraints, meaning that the data is restricted from being stored away from a locality or that the data is restricted from being stored at a particular locality, then the foreign data wrapper may provide data access without breaching the data constraint. The constraint may be incorporated due to various laws or regulations, or due to some other condition.

As the data tables 335-*a* and 335-*b* are accessible due to the connectors 340-*a*, a view 320 (e.g., schema) for the data may be generated in order to support access to the data by one or more applications 330 of the new cloud platform instance 350. A view may be an example of a database object (e.g., a table) that is based on a query 325. Thus, a query 325 for data of the data tables 335-*a* and 335-*b* may be generated and is used to define the view 320. The view 320 may function as a virtual table that represents the data of the tables 335-*a* and 335-*b* (e.g., based on a SELECT statement of the query 325). The view may not be physically stored in the new database instance. Rather, when a view is accessed or queried, the view may be instantiated in memory. Thus, the view 320, in conjunction with the connectors 340 may provide data in a live or near real-time manner. As described herein, the connectors 340 may be configured to periodically access or update the data tables 335, view may be dependent on the data access periodicity of the connectors 340. The view may be accessed or instantiated according to queries from the application 330 supported by the cloud platform instance 350. In some cases, the view 320 may be permissioned or published such that the view 320 is accessible by the cloud platform instance 350. The applications 330 may access the data of the view 320 using an example of a connector (e.g., a connector 340).

In some cases, the cloud platform instance or the application 330 may attempt to write to the view (e.g., as a write request 345). However, views may not be writable since they views may be dependent on a query and the underlying data. In such cases, the write request 345 may be routed to the correct data origin (e.g., the data tables 335 of the corresponding database instance). In some examples, the write request 345 may be directed to a synchronization table that is used by the connectors 340 to synchronize data between the data origin and the connected data location. Thus, as the connectors 340 may periodically synchronize data, new data that is written to the synchronization table may be eventually replicated to the data origin. For example, if the write request 345 is routed to the synchronization table corresponding to connector 340-*a*, then the data may be replicated to the data origin (e.g., the database instance supported by the server 310-*a*). In some examples, the write request 345 may be routed directly to the data origin instated of initially to the synchronization table.

Thus, the use of the view 320 and the connectors 340 may provide access to data corresponding to various tenants that may be associated with the same entity. Because the connectors may periodically access the data origin, the data of the view 320 may reflect a real time or near real time state of the data. Further, the utilization of foreign data wrappers may support data locality constraints without impinging the aggregated view. Additionally, the techniques described herein support data writes or updates by routing the write request 345 to the data origin (e.g., via the synchronization table supported by the connectors 340). Thus, functionality of the cloud platform instance 350 may be fully supported without expensive data replication to external systems.

Figure 4:
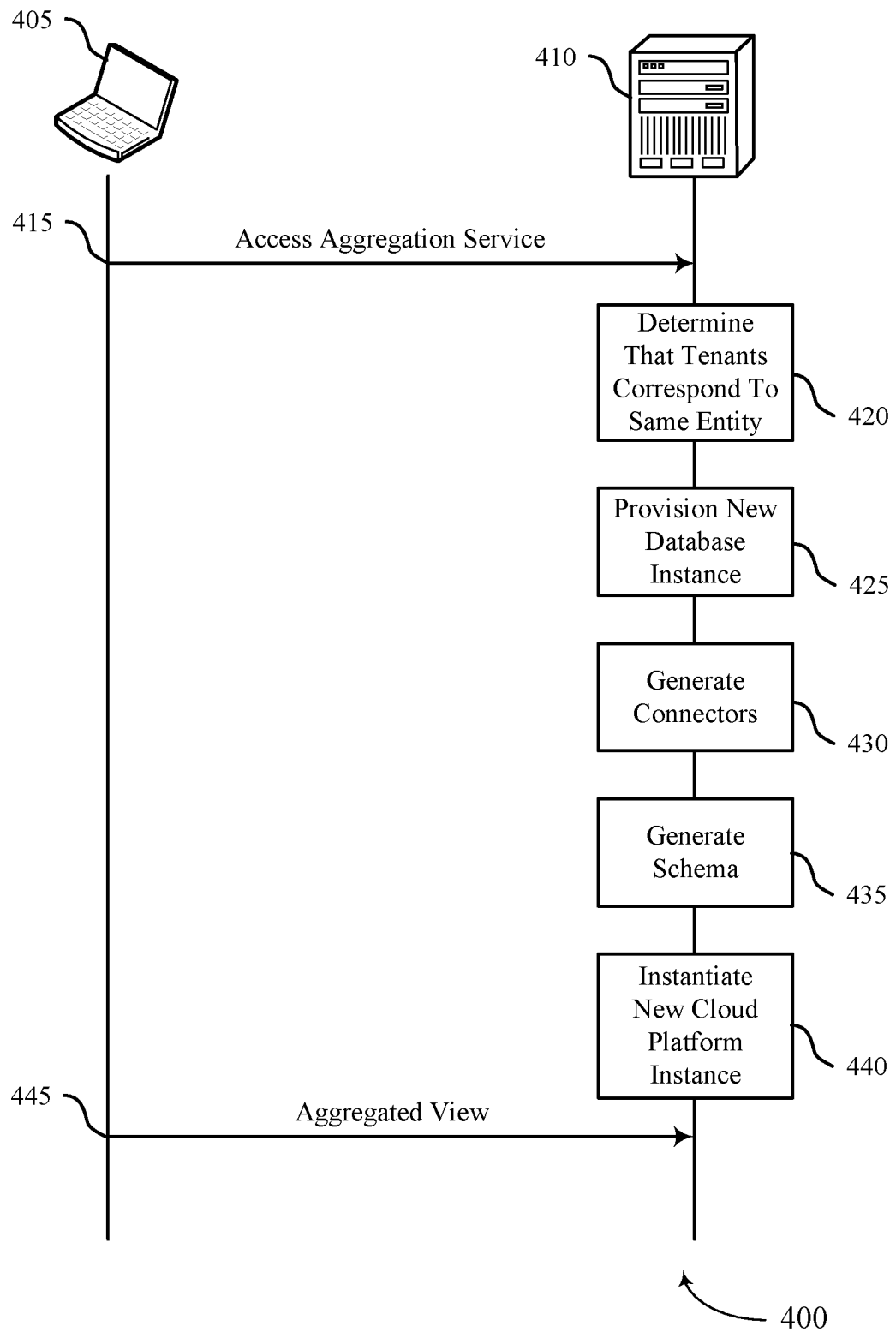
FIG. 4 illustrates an example of a process flow diagram that supports multitenant database instance view aggregation in accordance with aspects of the present disclosure.

FIG. 4 illustrates an example of a process flow diagram 400 that supports multitenant database instance view aggregation in accordance with aspects of the present disclosure. The process flow diagram 400 includes a user device 405 and a server 410, which may be examples of the corresponding devices as described with respect to FIGS. 1 through 3. The server 410 may support a PaaS as well as various cloud platform instances corresponding to tenants of a multi-tenant system and the associated database instances. Additionally, the server 410 may support an access aggregation service that is configured to support the techniques described herein.

At 415, the user device 405 may access the aggregation service supported by the server 410. The access may be based on a login request, an activation of a user interface control at a cloud platform instance, etc. At 420, the server 410 may determine that a plurality of tenants of a multi-tenant database system correspond to a common entity, where each tenant is associated with a respective instance of a cloud platform that services data from a corresponding database instance via at least one client application supported by the multitenant database system. In some cases, the determination may be based on a selection by a user or based on the multiple tenants being associated with a common entity identifier. In some examples, a user may be authenticated to access the systems (e.g., cloud platform instances) of the plurality of tenants.

At 420, the server 410 may provision, at the multitenant database system, a new database instance for the common entity based at least in part on determining that the plurality of tenants correspond to the common entity. The provisioning may include activating database resources, schemas, etc.

At 425, the server 410 may generate, for each database instance that corresponds to one of the plurality of tenants, a connector that is configured to access data of the corresponding database instance. In some cases, a connector may be configured to access the data periodically based on a selection of a time value. In some examples, the data access may include replication of the data to the new data base instance. In some examples, rather than replicating the data, the connector may use a foreign data wrapper to access the external data.

At 430, the server 410 may generate, based at least in part on the data accessed by the connector for each database instance, a schema for the new database instance that aggregates the data of each database instance accessed by the connector. The schema may be an example of a view or object that is accessible for data retrieval. In some cases, generating the schema includes generating a database object based on a query for the data accessed by the connector for each data base instance.

At 435, the server 410 may instantiate, at the multitenant database system, a new cloud platform instance that is configured to access the schema of the new database instance. The new the cloud platform instance may be configured to serve data queried from the schema of the new database instance via a client application. Instantiation of the cloud platform instance may include provisioning of resources including memory, operating system resources, executing application installs, and the like.

At 440, the server 410 may provide an aggregated view to the user device 405 via the new cloud platform instance. In some cases, an application supported by the new cloud platform instance may attempt to write to the view. In such cases, the server 410 may cause an indication of the write request to be transmitted to a point of origin of the object of the schema, where the point of origin corresponds to a first database instance associated with an instance of the cloud platform for a tenant of the plurality of tenants. In some examples, causing the indication to be transmitted includes transmitting the indication of the write request to a synchronization table corresponding to the point of origin. In some examples, causing the indication to be transmitted includes transmitting the indication of the write request to the database instance corresponding to the point of origin of the object.

Figure 5:
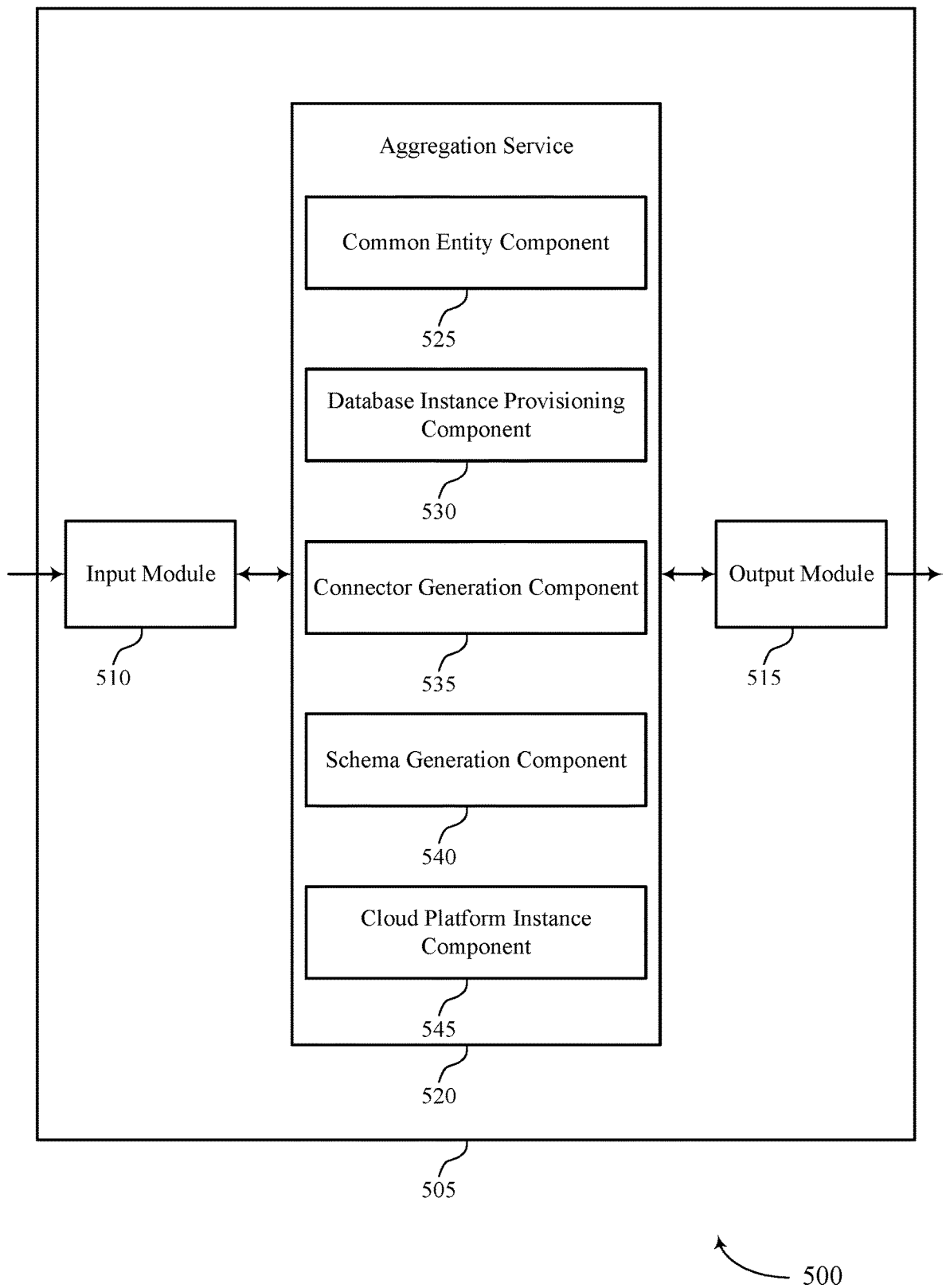
FIG. 5 shows a block diagram of an apparatus that supports multitenant database instance view aggregation in accordance with aspects of the present disclosure.

FIG. 5 shows a block diagram 500 of a device 505 that supports multitenant database instance view aggregation in accordance with aspects of the present disclosure. The device 505 may include an input module 510, an output module 515, and an aggregation service 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the aggregation service 520 to support multitenant database instance view aggregation. In some cases, the input module 510 may be a component of an I/O controller 710 as described with reference to FIG. 7.

The output module 515 may manage output signals for the device 505. For example, the output module 515 may receive signals from other components of the device 505, such as the aggregation service 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the aggregation service 520 may include a common entity component 525, a database instance provisioning component 530, a connector generation component 535, a schema generation component 540, a cloud platform instance component 545, or any combination thereof. In some examples, the aggregation service 520, or various components thereof, may be configured to perform various operations (e.g., receiving, monitoring, transmitting) using or otherwise in cooperation with the input module 510, the output module 515, or both. For example, the aggregation service 520 may receive information from the input module 510, send information to the output module 515, or be integrated in combination with the input module 510, the output module 515, or both to receive information, transmit information, or perform various other operations as described herein.

The aggregation service 520 may support data processing in accordance with examples as disclosed herein. The common entity component 525 may be configured as or otherwise support a means for determining that a plurality of tenants of a multitenant database system correspond to a common entity, wherein each tenant is associated with a respective instance of a cloud platform that services data from a corresponding database instance via at least one client application supported by the multitenant database system. The database instance provisioning component 530 may be configured as or otherwise support a means for provisioning, at the multitenant database system, a new database instance for the common entity based at least in part on determining that the plurality of tenants correspond to the common entity. The connector generation component 535 may be configured as or otherwise support a means for generating, for each database instance that corresponds to one of the plurality of tenants, a connector that is configured to access data of the corresponding database instance. The schema generation component 540 may be configured as or otherwise support a means for generating, based at least in part on the data accessed by the connector for each database instance, a schema for the new database instance that aggregates the data of each database instance accessed by the connector. The cloud platform instance component 545 may be configured as or otherwise support a means for instantiating, at the multitenant database system, a new cloud platform instance that is configured to access the schema of the new database instance, the cloud platform configured to serve data queried from the schema of the new database instance via a client application.

Figure 6:
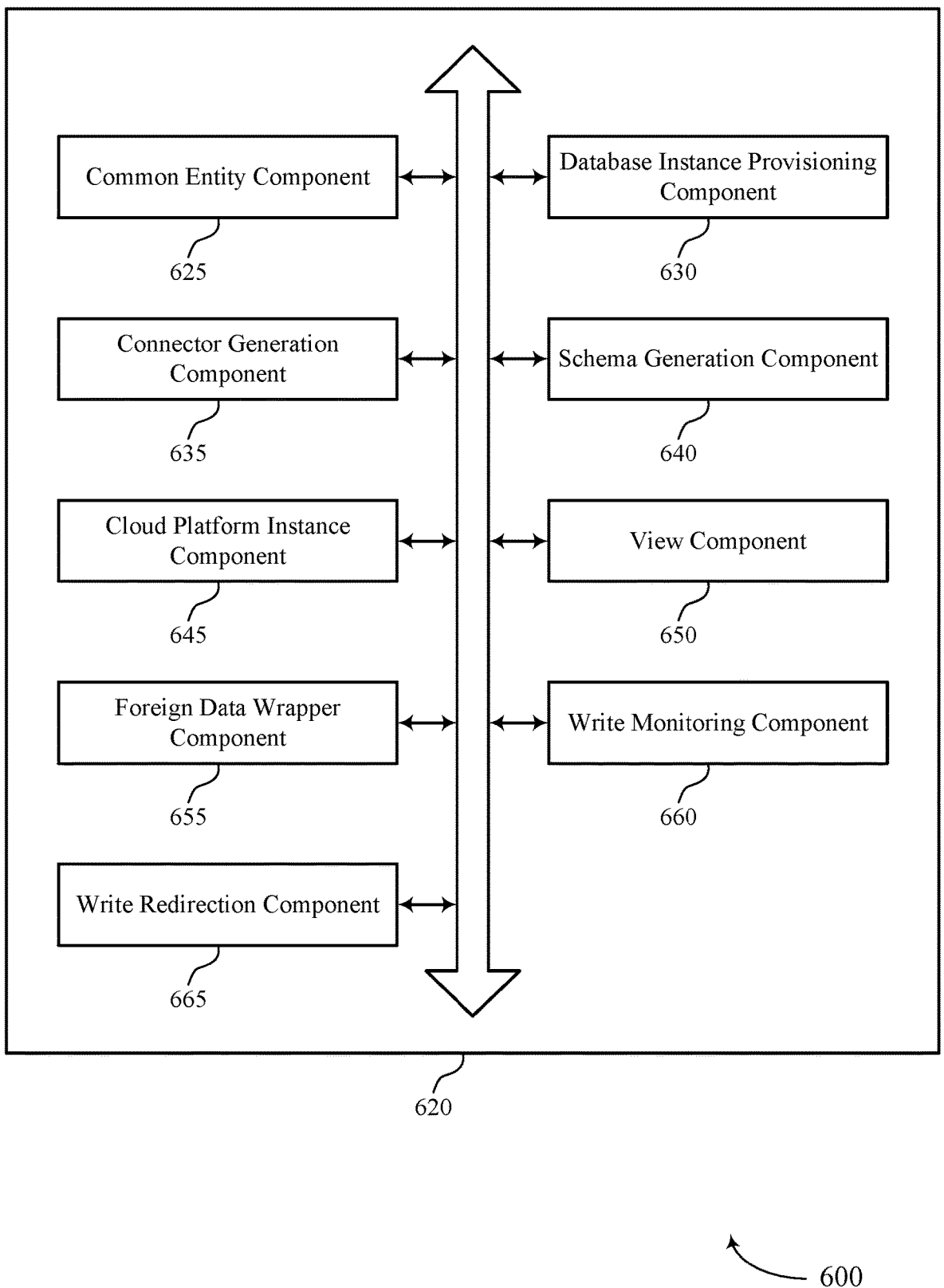
FIG. 6 shows a block diagram of an aggregation service that supports multitenant database instance view aggregation in accordance with aspects of the present disclosure.

FIG. 6 shows a block diagram 600 of an aggregation service 620 that supports multitenant database instance view aggregation in accordance with aspects of the present disclosure. The aggregation service 620 may be an example of aspects of an aggregation service or an aggregation service 520, or both, as described herein. The aggregation service 620, or various components thereof, may be an example of means for performing various aspects of multitenant database instance view aggregation as described herein. For example, the aggregation service 620 may include a common entity component 625, a database instance provisioning component 630, a connector generation component 635, a schema generation component 640, a cloud platform instance component 645, a view component 650, a foreign data wrapper component 655, a write monitoring component 660, a write redirection component 665, or any combination thereof. Each of these components may communicate, directly or indirectly, with one another (e.g., via one or more buses).

The aggregation service 620 may support data processing in accordance with examples as disclosed herein. The common entity component 625 may be configured as or otherwise support a means for determining that a plurality of tenants of a multitenant database system correspond to a common entity, wherein each tenant is associated with a respective instance of a cloud platform that services data from a corresponding database instance via at least one client application supported by the multitenant database system. The database instance provisioning component 630 may be configured as or otherwise support a means for provisioning, at the multitenant database system, a new database instance for the common entity based at least in part on determining that the plurality of tenants correspond to the common entity. The connector generation component 635 may be configured as or otherwise support a means for generating, for each database instance that corresponds to one of the plurality of tenants, a connector that is configured to access data of the corresponding database instance. The schema generation component 640 may be configured as or otherwise support a means for generating, based at least in part on the data accessed by the connector for each database instance, a schema for the new database instance that aggregates the data of each database instance accessed by the connector. The cloud platform instance component 645 may be configured as or otherwise support a means for instantiating, at the multitenant database system, a new cloud platform instance that is configured to access the schema of the new database instance, the cloud platform configured to serve data queried from the schema of the new database instance via a client application.

In some examples, to support generating the schema, the view component 650 may be configured as or otherwise support a means for generating a database object based on a query for the data accessed by the connector for each database instance, wherein the database object is queried by the client application to serve the data.

In some examples, to support generating the connector, the foreign data wrapper component 655 may be configured as or otherwise support a means for generating, for a first database instance corresponding to an instance of the cloud platform for a tenant of the plurality of tenants, a foreign data wrapper that accesses the data of the first database instance without replicating the data of the first database instance to the new database instance.

In some examples, the first database instance and the new database instance are implemented in different geographical locations. In some examples, the foreign data wrapper is generated based at least in part on the first database instance and the new database instance being implemented in different geographical locations.

In some examples, the write monitoring component 660 may be configured as or otherwise support a means for receiving, at the new cloud platform instance, a write request for writing new data to an object of the schema. In some examples, the write redirection component 665 may be configured as or otherwise support a means for causing an indication of the write request to be transmitted to a point of origin of the object of the schema, wherein the point of origin corresponds to a first database instance corresponding an instance of the cloud platform for a tenant of the plurality of tenants.

In some examples, to support causing the indication to be transmitted, the write redirection component 665 may be configured as or otherwise support a means for transmitting the indication of the write request to a synchronization table corresponding to the point of origin.

In some examples, to support causing the indication to be transmitted, the write redirection component 665 may be configured as or otherwise support a means for transmitting the indication of the write request to the database instance corresponding to the point of origin of the object.

In some examples, the connector generation component 635 may be configured as or otherwise support a means for replicating, based at least in part on generating the connector for a first database instance, the data from the first database instance to the new database instance.

In some examples, the connector generation component 635 may be configured as or otherwise support a means for configuring the connector for a first database instance to periodically synchronize data between the first database instance and the new database instance.

Figure 7:
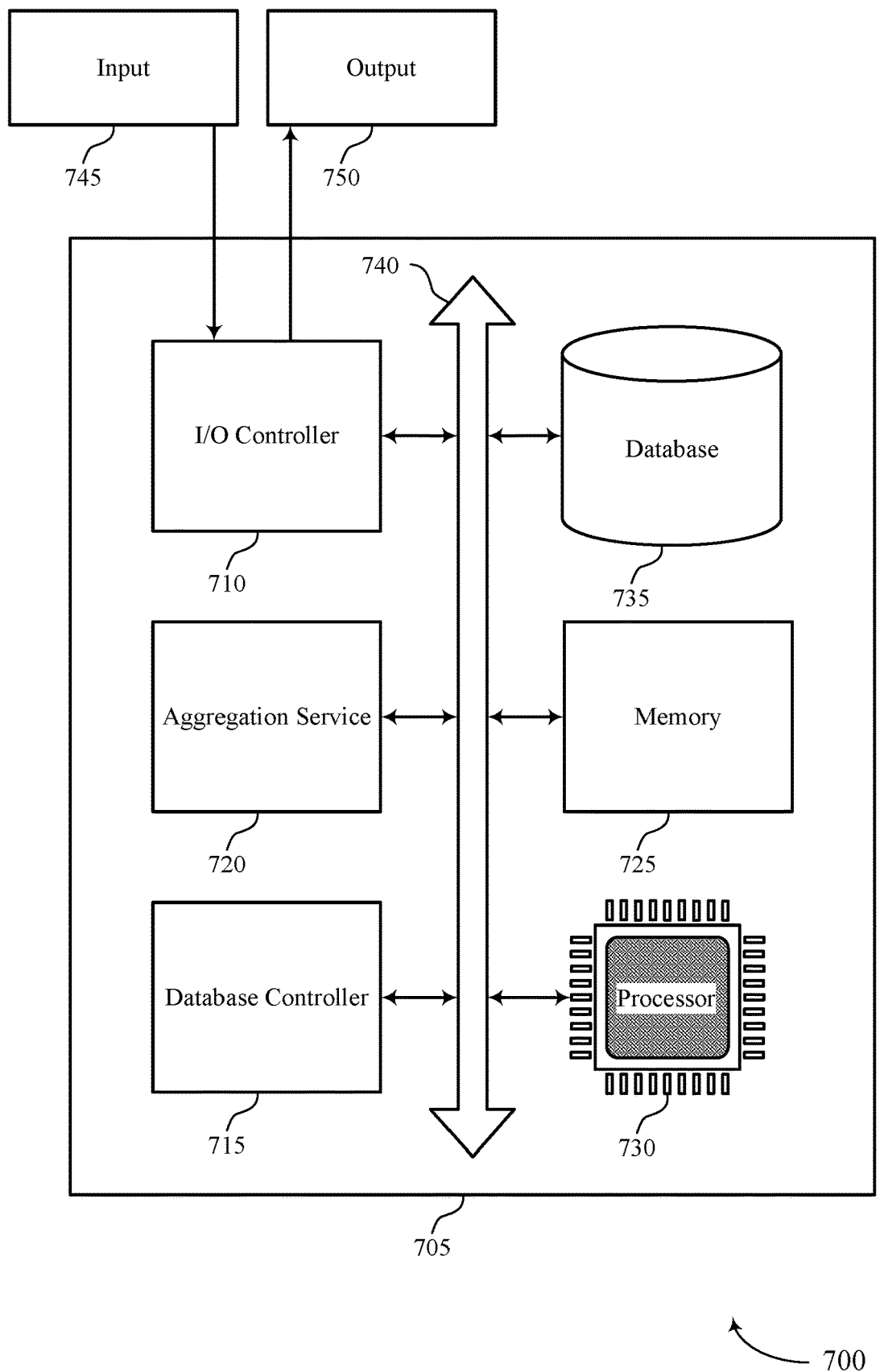
FIG. 7 shows a diagram of a system including a device that supports multitenant database instance view aggregation in accordance with aspects of the present disclosure.

FIG. 7 shows a diagram of a system 700 including a device 705 that supports multitenant database instance view aggregation in accordance with aspects of the present disclosure. The device 705 may be an example of or include the components of a device 505 as described herein. The device 705 may include components for bi-directional data communications including components for transmitting and receiving communications, such as an aggregation service 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into processor 730. The processor 730 may be configured to execute computer-readable instructions stored in a memory 725 to perform various functions (e.g., functions or tasks supporting multitenant database instance view aggregation).

The aggregation service 720 may support data processing in accordance with examples as disclosed herein. For example, the aggregation service 720 may be configured as or otherwise support a means for determining that a plurality of tenants of a multitenant database system correspond to a common entity, wherein each tenant is associated with a respective instance of a cloud platform that services data from a corresponding database instance via at least one client application supported by the multitenant database system. The aggregation service 720 may be configured as or otherwise support a means for provisioning, at the multitenant database system, a new database instance for the common entity based at least in part on determining that the plurality of tenants correspond to the common entity. The aggregation service 720 may be configured as or otherwise support a means for generating, for each database instance that corresponding to one of the plurality of tenants, a connector that is configured to access data of the corresponding database instance. The aggregation service 720 may be configured as or otherwise support a means for generating, based at least in part on the data accessed by the connector for each database instance, a schema for the new database instance that aggregates the data of each database instance accessed by the connector. The aggregation service 720 may be configured as or otherwise support a means for instantiating, at the multitenant database system, a new cloud platform instance that is configured to access the schema of the new database instance, the cloud platform configured to serve data queried from the schema of the new database instance via a client application.

Figure 8:
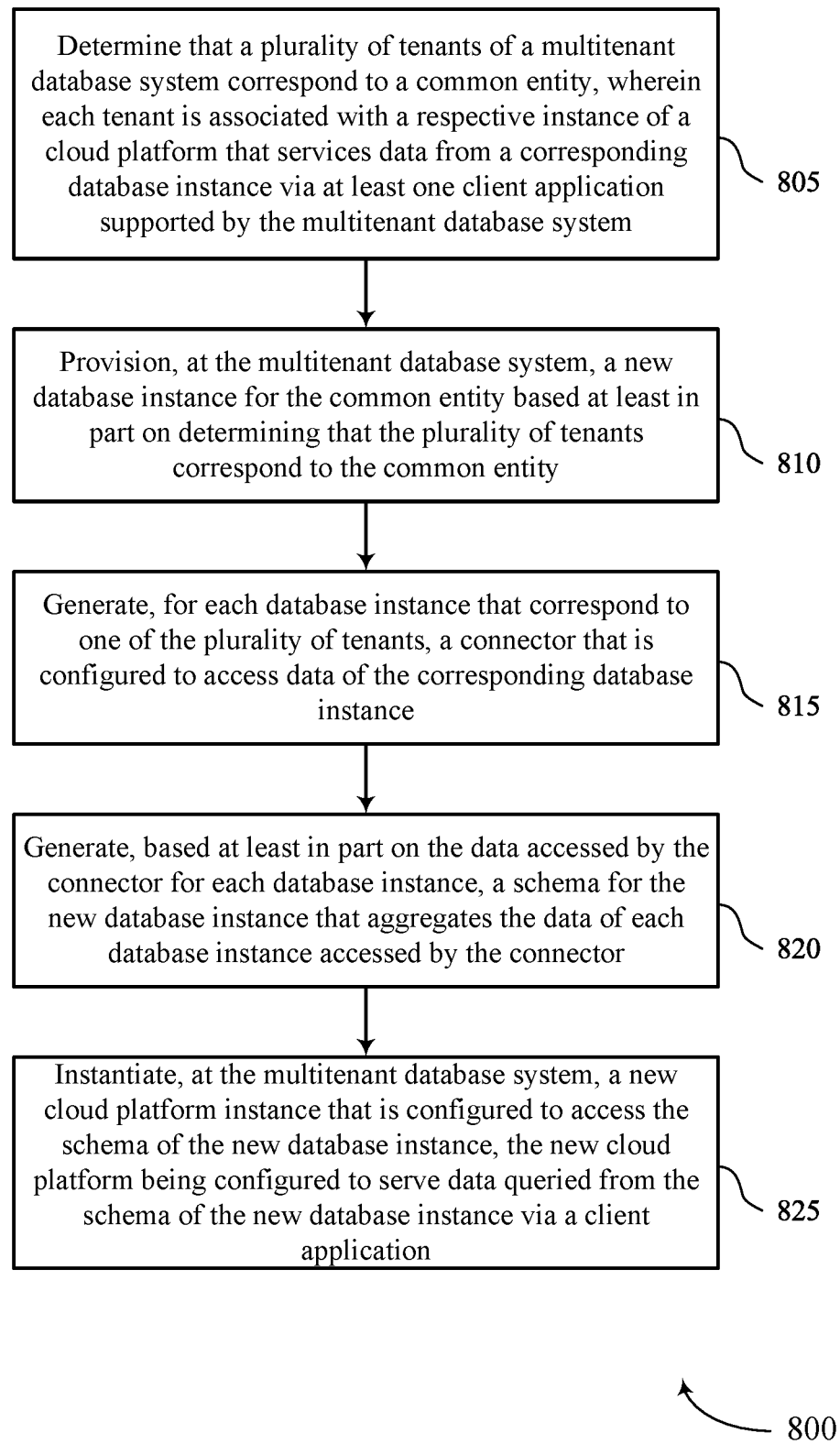
FIGS. 8 through 10 show flowcharts illustrating methods that support multitenant database instance view aggregation in accordance with aspects of the present disclosure.

FIG. 8 shows a flowchart illustrating a method 800 that supports multitenant database instance view aggregation in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 805, the method may include determining that a plurality of tenants of a multitenant database system correspond to a common entity, wherein each tenant is associated with a respective instance of a cloud platform that services data from a corresponding database instance via at least one client application supported by the multitenant database system. The operations of 805 may be performed in accordance with examples as disclosed herein. In some examples, aspects of the operations of 805 may be performed by a common entity component 625 as described with reference to FIG. 6.

At 810, the method may include provisioning, at the multitenant database system, a new database instance for the common entity based at least in part on determining that the plurality of tenants correspond to the common entity. The operations of 810 may be performed in accordance with examples as disclosed herein. In some examples, aspects of the operations of 810 may be performed by a database instance provisioning component 630 as described with reference to FIG. 6.

At 815, the method may include generating, for each database instance that corresponds to one of the plurality of tenants, a connector that is configured to access data of the corresponding database instance. The operations of 815 may be performed in accordance with examples as disclosed herein. In some examples, aspects of the operations of 815 may be performed by a connector generation component 635 as described with reference to FIG. 6.

At 820, the method may include generating, based at least in part on the data accessed by the connector for each database instance, a schema for the new database instance that aggregates the data of each database instance accessed by the connector. The operations of 820 may be performed in accordance with examples as disclosed herein. In some examples, aspects of the operations of 820 may be performed by a schema generation component 640 as described with reference to FIG. 6.

At 825, the method may include instantiating, at the multitenant database system, a new cloud platform instance that is configured to access the schema of the new database instance, the new cloud platform is configured to serve data queried from the schema of the new database instance via a client application. The operations of 825 may be performed in accordance with examples as disclosed herein. In some examples, aspects of the operations of 825 may be performed by a cloud platform instance component 645 as described with reference to FIG. 6.

Figure 9:
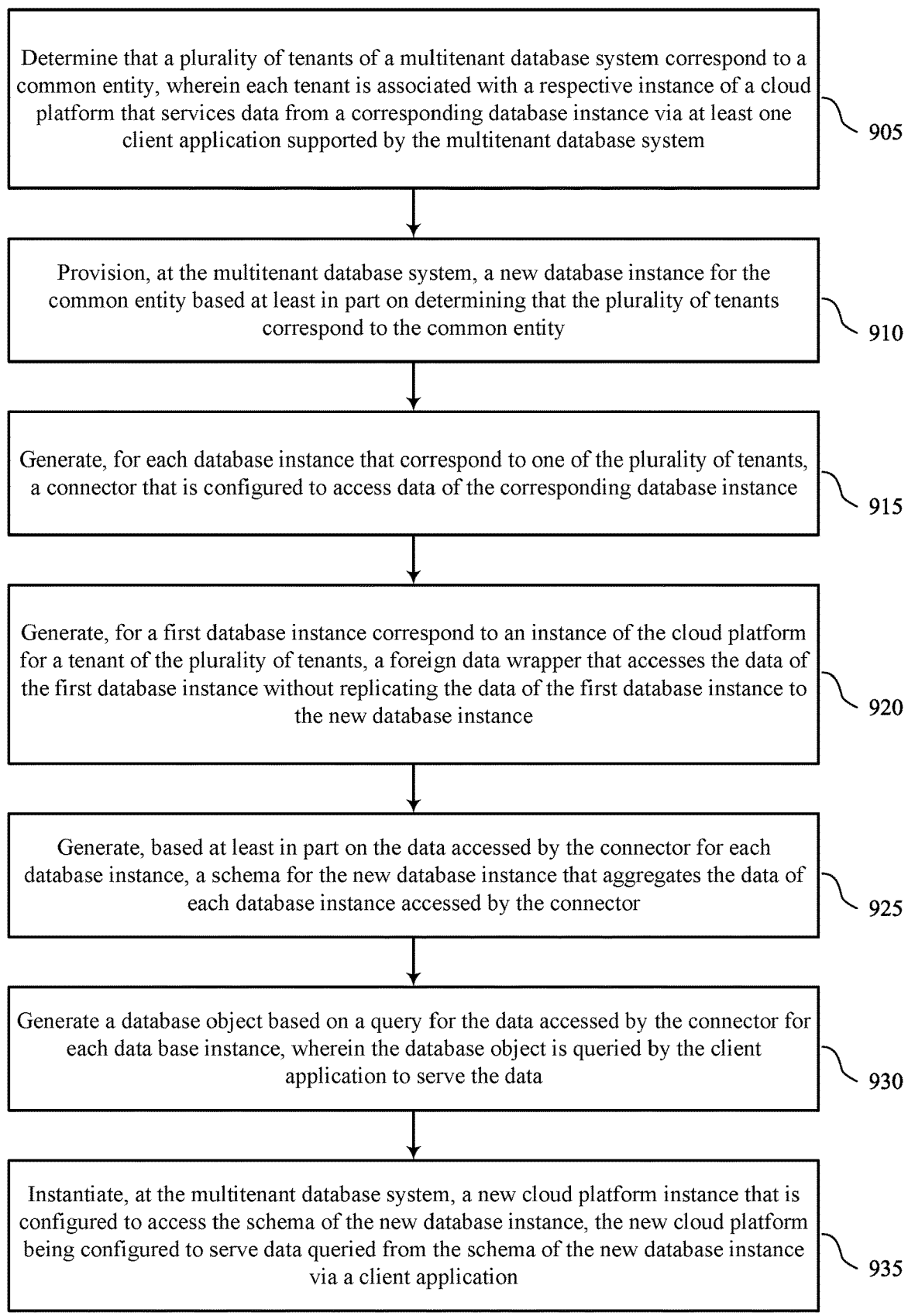

FIG. 9 shows a flowchart illustrating a method 900 that supports multitenant database instance view aggregation in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 905, the method may include determining that a plurality of tenants of a multitenant database system correspond to a common entity, wherein each tenant is associated with a respective instance of a cloud platform that services data from a corresponding database instance via at least one client application supported by the multitenant database system. The operations of 905 may be performed in accordance with examples as disclosed herein. In some examples, aspects of the operations of 905 may be performed by a common entity component 625 as described with reference to FIG. 6.

At 910, the method may include provisioning, at the multitenant database system, a new database instance for the common entity based at least in part on determining that the plurality of tenants correspond to the common entity. The operations of 910 may be performed in accordance with examples as disclosed herein. In some examples, aspects of the operations of 910 may be performed by a database instance provisioning component 630 as described with reference to FIG. 6.

At 915, the method may include generating, for each database instance that corresponds to one of the plurality of tenants, a connector that is configured to access data of the corresponding database instance. The operations of 915 may be performed in accordance with examples as disclosed herein. In some examples, aspects of the operations of 915 may be performed by a connector generation component 635 as described with reference to FIG. 6.

At 920, the method may include generating, for a first database instance corresponding to an instance of the cloud platform for a tenant of the plurality of tenants, a foreign data wrapper that accesses the data of the first database instance without replicating the data of the first database instance to the new database instance. The operations of 920 may be performed in accordance with examples as disclosed herein. In some examples, aspects of the operations of 920 may be performed by a foreign data wrapper component 655 as described with reference to FIG. 6.

At 925, the method may include generating, based at least in part on the data accessed by the connector for each database instance, a schema for the new database instance that aggregates the data of each database instance accessed by the connector. The operations of 925 may be performed in accordance with examples as disclosed herein. In some examples, aspects of the operations of 925 may be performed by a schema generation component 640 as described with reference to FIG. 6.

At 930, the method may include generating a database object based on a query for the data accessed by the connector for each data base instance, wherein the database object is queried by the client application to serve the data. The operations of 930 may be performed in accordance with examples as disclosed herein. In some examples, aspects of the operations of 930 may be performed by a view component 650 as described with reference to FIG. 6.

At 935, the method may include instantiating, at the multitenant database system, a new cloud platform instance that is configured to access the schema of the new database instance, the new cloud platform is configured to serve data queried from the schema of the new database instance via a client application. The operations of 935 may be performed in accordance with examples as disclosed herein. In some examples, aspects of the operations of 935 may be performed by a cloud platform instance component 645 as described with reference to FIG. 6.

Figure 10:
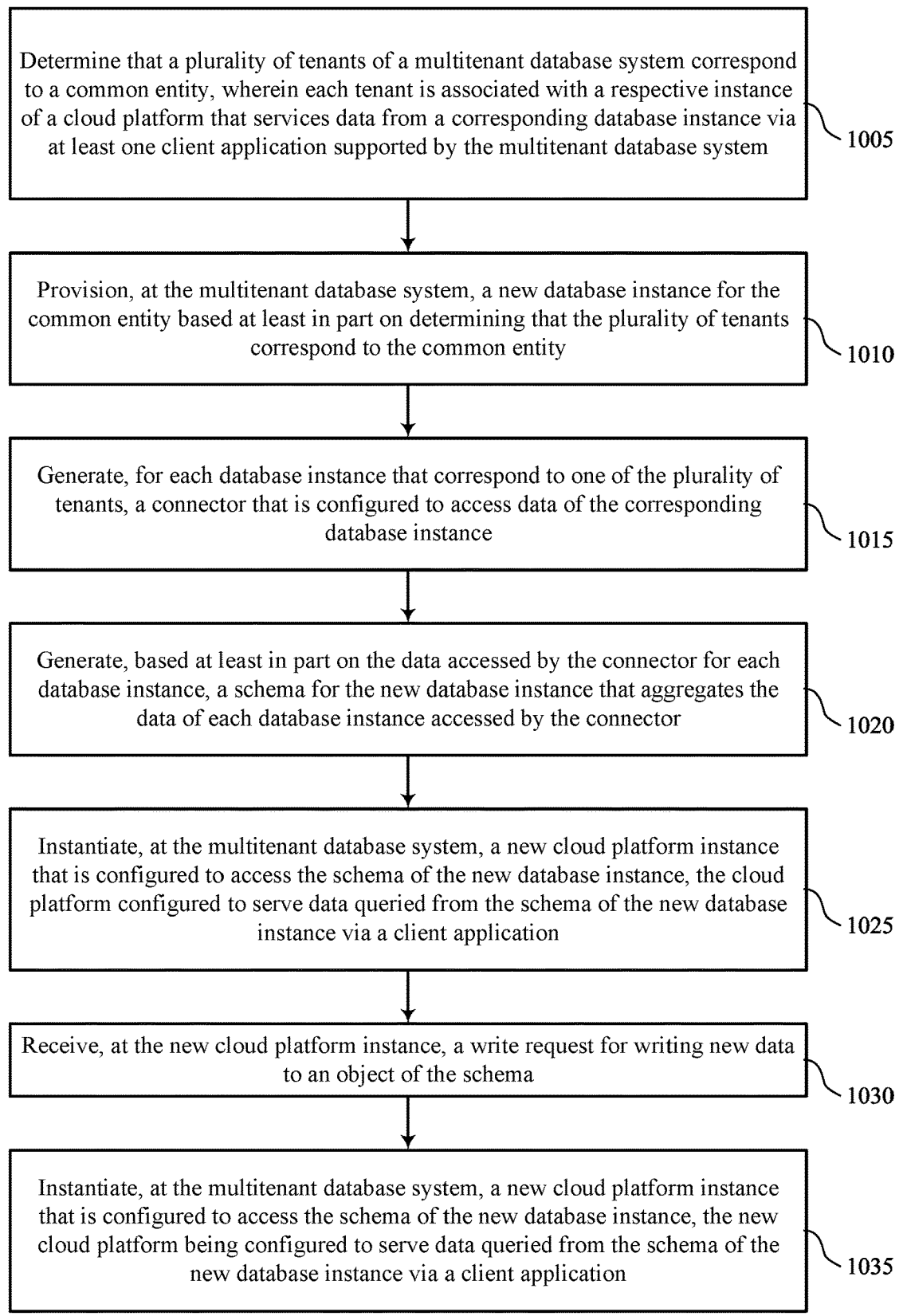

FIG. 10 shows a flowchart illustrating a method 1000 that supports multitenant database instance view aggregation in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1005, the method may include determining that a plurality of tenants of a multitenant database system correspond to a common entity, wherein each tenant is associated with a respective instance of a cloud platform that services data from a corresponding database instance via at least one client application supported by the multitenant database system. The operations of 1005 may be performed in accordance with examples as disclosed herein. In some examples, aspects of the operations of 1005 may be performed by a common entity component 625 as described with reference to FIG. 6.

At 1010, the method may include provisioning, at the multitenant database system, a new database instance for the common entity based at least in part on determining that the plurality of tenants correspond to the common entity. The operations of 1010 may be performed in accordance with examples as disclosed herein. In some examples, aspects of the operations of 1010 may be performed by a database instance provisioning component 630 as described with reference to FIG. 6.

At 1015, the method may include generating, for each database instance that corresponds to one of the plurality of tenants, a connector that is configured to access data of the corresponding database instance. The operations of 1015 may be performed in accordance with examples as disclosed herein. In some examples, aspects of the operations of 1015 may be performed by a connector generation component 635 as described with reference to FIG. 6.

At 1020, the method may include generating, based at least in part on the data accessed by the connector for each database instance, a schema for the new database instance that aggregates the data of each database instance accessed by the connector. The operations of 1020 may be performed in accordance with examples as disclosed herein. In some examples, aspects of the operations of 1020 may be performed by a schema generation component 640 as described with reference to FIG. 6.

At 1025, the method may include instantiating, at the multitenant database system, a new cloud platform instance that is configured to access the schema of the new database instance, the new cloud platform is configured to serve data queried from the schema of the new database instance via a client application. The operations of 1025 may be performed in accordance with examples as disclosed herein. In some examples, aspects of the operations of 1025 may be performed by a cloud platform instance component 645 as described with reference to FIG. 6.

At 1030, the method may include receiving, at the new cloud platform instance, a write request for writing new data to an object of the schema. The operations of 1030 may be performed in accordance with examples as disclosed herein. In some examples, aspects of the operations of 1030 may be performed by a write monitoring component 660 as described with reference to FIG. 6.

At 1035, the method may include causing an indication of the write request to be transmitted to a point of origin of the object of the schema, wherein the point of origin corresponds to a first database instance corresponding an instance of the cloud platform for a tenant of the plurality of tenants. The operations of 1035 may be performed in accordance with examples as disclosed herein. In some examples, aspects of the operations of 1035 may be performed by a write redirection component 665 as described with reference to FIG. 6.

A method for data processing is described. The method may include determining that a plurality of tenants of a multitenant database system correspond to a common entity, wherein each tenant is associated with a respective instance of a cloud platform that services data from a corresponding database instance via at least one client application supported by the multitenant database system, provisioning, at the multitenant database system, a new database instance for the common entity based at least in part on determining that the plurality of tenants correspond to the common entity, generating, for each database instance that corresponds to one of the plurality of tenants, a connector that is configured to access data of the corresponding database instance, generating, based at least in part on the data accessed by the connector for each database instance, a schema for the new database instance that aggregates the data of each database instance accessed by the connector, and instantiating, at the multitenant database system, a new cloud platform instance that is configured to access the schema of the new database instance, the cloud platform configured to serve data queried from the schema of the new database instance via a client application.

An apparatus for data processing is described. The apparatus may include a processor, memory coupled with the processor, and instructions stored in the memory. The instructions may be executable by the processor to cause the apparatus to determine that a plurality of tenants of a multitenant database system correspond to a common entity, wherein each tenant is associated with a respective instance of a cloud platform that services data from a corresponding database instance via at least one client application supported by the multitenant database system, provision, at the multitenant database system, a new database instance for the common entity based at least in part on determining that the plurality of tenants correspond to the common entity, generating, for each database instance that correspond to one of the plurality of tenants, a connector that is configured to access data of the corresponding database instance, generating, based at least in part on the data accessed by the connector for each database instance, a schema for the new database instance that aggregates the data of each database instance accessed by the connector, and instantiate, at the multitenant database system, a new cloud platform instance that is configured to access the schema of the new database instance, the cloud platform configured to serve data queried from the schema of the new database instance via a client application.

Another apparatus for data processing is described. The apparatus may include means for determining that a plurality of tenants of a multitenant database system correspond to a common entity, wherein each tenant is associated with a respective instance of a cloud platform that services data from a corresponding database instance via at least one client application supported by the multitenant database system, means for provisioning, at the multitenant database system, a new database instance for the common entity based at least in part on determining that the plurality of tenants correspond to the common entity, means for generating, for each database instance that corresponds to one of the plurality of tenants, a connector that is configured to access data of the corresponding database instance, means for generating, based at least in part on the data accessed by the connector for each database instance, a schema for the new database instance that aggregates the data of each database instance accessed by the connector, and means for instantiating, at the multitenant database system, a new cloud platform instance that is configured to access the schema of the new database instance, the cloud platform configured to serve data queried from the schema of the new database instance via a client application.

A non-transitory computer-readable medium storing code for data processing is described. The code may include instructions executable by a processor to determine that a plurality of tenants of a multitenant database system correspond to a common entity, wherein each tenant is associated with a respective instance of a cloud platform that services data from a corresponding database instance via at least one client application supported by the multitenant database system, provision, at the multitenant database system, a new database instance for the common entity based at least in part on determining that the plurality of tenants correspond to the common entity, generating, for each database instance that correspond to one of the plurality of tenants, a connector that is configured to access data of the corresponding database instance, generating, based at least in part on the data accessed by the connector for each database instance, a schema for the new database instance that aggregates the data of each database instance accessed by the connector, and instantiate, at the multitenant database system, a new cloud platform instance that is configured to access the schema of the new database instance, the cloud platform configured to serve data queried from the schema of the new database instance via a client application.

In some examples of the method, apparatuses, and non-transitory computer-readable medium described herein, generating the schema may include operations, features, means, or instructions for generating a database object based on a query for the data accessed by the connector for each data base instance, wherein the database object may be queried by the client application to serve the data.

In some examples of the method, apparatuses, and non-transitory computer-readable medium described herein, generating the connector may include operations, features, means, or instructions for generating, for a first database instance corresponding to an instance of the cloud platform for a tenant of the plurality of tenants, a foreign data wrapper that accesses the data of the first database instance without replicating the data of the first database instance to the new database instance.

In some examples of the method, apparatuses, and non-transitory computer-readable medium described herein, the first database instance and the new database instance may be implemented in different geographical locations, and the foreign data wrapper may be generated based at least in part on the first database instance and the new database instance being implemented in different geographical locations.

Some examples of the method, apparatuses, and non-transitory computer-readable medium described herein may further include operations, features, means, or instructions for receiving, at the new cloud platform instance, a write request for writing new data to an object of the schema and causing an indication of the write request to be transmitted to a point of origin of the object of the schema, wherein the point of origin corresponds to a first database instance corresponding an instance of the cloud platform for a tenant of the plurality of tenants.

In some examples of the method, apparatuses, and non-transitory computer-readable medium described herein, causing the indication to be transmitted may include operations, features, means, or instructions for transmitting the indication of the write request to a synchronization table corresponding to the point of origin.

In some examples of the method, apparatuses, and non-transitory computer-readable medium described herein, causing the indication to be transmitted may include operations, features, means, or instructions for transmitting the indication of the write request to the database instance corresponding to the point of origin of the object.

In some examples of the method, apparatuses, and non-transitory computer-readable medium described herein, replicating, based at least in part on generating the connector for a first database instance, the data from the first database instance to the new database instance.

Some examples of the method, apparatuses, and non-transitory computer-readable medium described herein may further include operations, features, means, or instructions for configuring the connector for a first database instance to periodically synchronize data between the first database instance and the new database instance.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   determining that a plurality of tenants of a multitenant database system correspond to a common entity, wherein each tenant is associated with a respective instance of a cloud platform that services data from a corresponding database instance via at least one client application supported by the multitenant database system;
   provisioning, at the multitenant database system, a new database instance for the common entity based at least in part on determining that the plurality of tenants correspond to the common entity;
   generating, for each database instance that corresponds to one of the plurality of tenants, a connector that is configured to access data of the corresponding database instance;
   generating, based at least in part on the data accessed by the connector for each database instance, a schema for the new database instance that aggregates the data of each database instance accessed by the connector; and
   instantiating, at the multitenant database system, a new cloud platform instance that is configured to access the schema of the new database instance, the new cloud platform instance configured to serve data queried from the schema of the new database instance via a client application.

2. The method of claim 1, wherein generating the schema comprises:
   generating a database object based on a query for the data accessed by the connector for each data base instance, wherein the database object is queried by the client application to serve the data.

3. The method of claim 1, wherein generating the connector comprises:
   generating, for a first database instance corresponding to an instance of the cloud platform for a tenant of the plurality of tenants, a foreign data wrapper that accesses the data of the first database instance without replicating the data of the first database instance to the new database instance.

4. The method of claim 3, wherein
   the first database instance and the new database instance are implemented in different geographical locations, and
   the foreign data wrapper is generated based at least in part on the first database instance and the new database instance being implemented in different geographical locations.

5. The method of claim 1, further comprising:
receiving, at the new cloud platform instance, a write request for writing new data to an object of the schema; and
causing an indication of the write request to be transmitted to a point of origin of the object of the schema, wherein the point of origin corresponds to a first database instance corresponding an instance of the cloud platform for a tenant of the plurality of tenants.

6. The method of claim 5, wherein causing the indication to be transmitted comprises:
transmitting the indication of the write request to a synchronization table corresponding to the point of origin.

7. The method of claim 5, wherein causing the indication to be transmitted comprises:
transmitting the indication of the write request to the database instance corresponding to the point of origin of the object.

8. The method of claim 1, further comprising:
replicating, based at least in part on generating the connector for a first database instance, the data from the first database instance to the new database instance.

9. The method of claim 1, further comprising:
configuring the connector for a first database instance to periodically synchronize data between the first database instance and the new database instance.

10. An apparatus for data processing, comprising:
a processor;
memory coupled with the processor; and
instructions stored in the memory and executable by the processor to cause the apparatus to:
determine that a plurality of tenants of a multitenant database system correspond to a common entity, wherein each tenant is associated with a respective instance of a cloud platform that services data from a corresponding database instance via at least one client application supported by the multitenant database system;
provision, at the multitenant database system, a new database instance for the common entity based at least in part on determining that the plurality of tenants correspond to the common entity;
generate, for each database instance that correspond to one of the plurality of tenants, a connector that is configured to access data of the corresponding database instance;
generate, based at least in part on the data accessed by the connector for each database instance, a schema for the new database instance that aggregates the data of each database instance accessed by the connector; and
instantiate, at the multitenant database system, a new cloud platform instance that is configured to access the schema of the new database instance, the new cloud platform instance configured to serve data queried from the schema of the new database instance via a client application.

11. The apparatus of claim 10, wherein the instructions to generate the schema are executable by the processor to cause the apparatus to:
generate a database object based on a query for the data accessed by the connector for each data base instance, wherein the database object is queried by the client application to serve the data.

12. The apparatus of claim 10, wherein the instructions to generate the connector are executable by the processor to cause the apparatus to:
generate, for a first database instance correspond to an instance of the cloud platform for a tenant of the plurality of tenants, a foreign data wrapper that accesses the data of the first database instance without replicating the data of the first database instance to the new database instance.

13. The apparatus of claim 12, wherein:
the first database instance and the new database instance are implemented in different geographical locations, and
the foreign data wrapper is generated based at least in part on the first database instance and the new database instance being implemented in different geographical locations.

14. The apparatus of claim 10, wherein the instructions are further executable by the processor to cause the apparatus to:
receive, at the new cloud platform instance, a write request for writing new data to an object of the schema; and
cause an indication of the write request to be transmitted to a point of origin of the object of the schema, wherein the point of origin corresponds to a first database instance corresponding an instance of the cloud platform for a tenant of the plurality of tenants.

15. The apparatus of claim 14, wherein the instructions to cause the indication to be transmitted are executable by the processor to cause the apparatus to:
transmit the indication of the write request to a synchronization table corresponding to the point of origin.

16. A non-transitory computer-readable medium storing code for data processing, the code comprising instructions executable by a processor to:
determine that a plurality of tenants of a multitenant database system correspond to a common entity, wherein each tenant is associated with a respective instance of a cloud platform that services data from a corresponding database instance via at least one client application supported by the multitenant database system;
provision, at the multitenant database system, a new database instance for the common entity based at least in part on determining that the plurality of tenants correspond to the common entity;
generate, for each database instance that correspond to one of the plurality of tenants, a connector that is configured to access data of the corresponding database instance;
generate, based at least in part on the data accessed by the connector for each database instance, a schema for the new database instance that aggregates the data of each database instance accessed by the connector; and
instantiate, at the multitenant database system, a new cloud platform instance that is configured to access the schema of the new database instance, the new cloud platform instance configured to serve data queried from the schema of the new database instance via a client application.

17. The non-transitory computer-readable medium of claim 16, wherein the instructions to generate the schema are executable by the processor to:
generate a database object based on a query for the data accessed by the connector for each data base instance, wherein the database object is queried by the client application to serve the data.

18. The non-transitory computer-readable medium of claim 16, wherein the instructions to generate the connector are executable by the processor to:
generate, for a first database instance correspond to an instance of the cloud platform for a tenant of the plurality of tenants, a foreign data wrapper that accesses the data of the first database instance without replicating the data of the first database instance to the new database instance.

19. The non-transitory computer-readable medium of claim 18, wherein:
the first database instance and the new database instance are implemented in different geographical locations, and
the foreign data wrapper is generated based at least in part on the first database instance and the new database instance being implemented in different geographical locations.

20. The non-transitory computer-readable medium of claim 16, wherein the instructions are further executable by the processor to:
receive, at the new cloud platform instance, a write request for writing new data to an object of the schema; and
cause an indication of the write request to be transmitted to a point of origin of the object of the schema, wherein the point of origin corresponds to a first database instance corresponding an instance of the cloud platform for a tenant of the plurality of tenants.

* * * * *